(12) United States Patent
Stemmle

(10) Patent No.: US 7,778,728 B2
(45) Date of Patent: Aug. 17, 2010

(54) APPARATUS AND METHOD FOR POSITIONING OBJECTS/MAILPIECES

(75) Inventor: Denis J. Stemmle, Stratford, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 836 days.

(21) Appl. No.: 11/487,202

(22) Filed: Jul. 13, 2006

(65) Prior Publication Data

US 2008/0015735 A1 Jan. 17, 2008

(51) Int. Cl.
*G06F 7/00* (2006.01)
(52) U.S. Cl. .................. 700/228; 209/584; 700/224
(58) Field of Classification Search ............ 209/584, 209/583, 900, 922, 933; 700/228, 224
See application file for complete search history.

(56) References Cited

U.S. PATENT DOCUMENTS

| | | | |
|---|---|---|---|
| 3,420,368 A | 1/1969 | Sorrells | |
| 3,452,509 A | 7/1969 | Hauer | |
| 3,587,856 A | 6/1971 | Lemelson | |
| 3,757,939 A | 9/1973 | Henig | |
| 3,884,370 A | 5/1975 | Bradshaw | |
| 3,889,811 A | 6/1975 | Yoshimura | |
| 3,901,797 A | 8/1975 | Storace | |
| 3,904,516 A | 9/1975 | Chiba | |
| 3,933,094 A | 1/1976 | Murphy | |
| 3,955,678 A * | 5/1976 | Moyer | 209/564 |
| 4,008,813 A | 2/1977 | Leersnijder | |
| 4,058,217 A | 11/1977 | Vaughan | |
| 4,106,636 A | 8/1978 | Ouimet | |
| 4,169,529 A | 10/1979 | Hunter | |

(Continued)

FOREIGN PATENT DOCUMENTS

EP 0582869 B1 2/1999

(Continued)

OTHER PUBLICATIONS

U.S. Appl. No. 11/885,231, U.S. family member of International Application No. PCT/US2005/044560.

(Continued)

*Primary Examiner*—Gene Crawford
*Assistant Examiner*—Ramya Prakasam
(74) *Attorney, Agent, or Firm*—Leland Schultz; Roberts Mlotkowski Safran & Cole, P.C.

(57) ABSTRACT

An apparatus and method for positioning objects at a desired reference position, including a sensor for determining the length of each object/mailpiece from a leading to a trailing edge, a transport mechanism having a positionable drive element for transporting the object/mailpiece, and a controller or processor for controlling the position of the drive element to release the object/mailpiece at a desired reference position. The described embodiments of the invention relate to positioning an object/mailpiece in a clamp assembly of a mixed mail sorter. The jaws of the clamp assembly are separated to receive the object/mailpiece by a pair of spiral cams. The spiral cams interpose and engage tabs of each jaw to open and close the clamp assembly as they concomitantly effect translation of the clamp assembly linearly past the positioning apparatus. The apparatus and method ensures predictable conveyance and release of objects/mailpieces while being manipulated by automated handling equipment.

32 Claims, 8 Drawing Sheets

U.S. PATENT DOCUMENTS

| | | | |
|---|---|---|---|
| 4,244,672 A | 1/1981 | Lund | |
| 4,334,759 A | 6/1982 | Clausing | |
| 4,507,739 A | 3/1985 | Haruki | |
| 4,627,540 A | 12/1986 | Takeda | |
| 4,688,678 A | 8/1987 | Zue | |
| 4,738,368 A | 4/1988 | Shaw | |
| 4,782,238 A | 11/1988 | Radl et al. | |
| 4,868,570 A | 9/1989 | Davis | |
| 4,869,637 A | 9/1989 | deGroot | |
| 4,874,281 A | 10/1989 | Bergerioux | |
| 4,891,088 A | 1/1990 | Svyatsky | |
| 4,895,242 A | 1/1990 | Michel | |
| 4,921,107 A | 5/1990 | Hofer | |
| 4,923,022 A | 5/1990 | Hsieh | |
| 4,965,829 A | 10/1990 | Lemelson | |
| 5,031,223 A | 7/1991 | Rosenbaum | |
| 5,042,667 A | 8/1991 | Keough | |
| 5,119,954 A | 6/1992 | Svyatsky | |
| 5,186,336 A | 2/1993 | Pippin | |
| 5,291,002 A | 3/1994 | Agnew | |
| 5,362,200 A * | 11/1994 | Ushirogata | 414/791 |
| 5,465,662 A | 11/1995 | Keung | |
| 5,470,427 A | 11/1995 | Mikel | |
| 5,480,032 A | 1/1996 | Pippin | |
| 5,718,321 A | 2/1998 | Brugger | |
| 5,981,891 A | 11/1999 | Yamashita | |
| 6,126,017 A | 10/2000 | Hours | |
| 6,227,378 B1 | 5/2001 | Jones | |
| 6,241,244 B1 | 6/2001 | Modi | |
| 6,276,509 B1 | 8/2001 | Schuster | |
| 6,347,710 B1 | 2/2002 | Ryan | |
| 6,365,862 B1 | 4/2002 | Miller | |
| 6,403,906 B1 | 6/2002 | De Leo | |
| 6,405,101 B1 | 6/2002 | Johanson | |
| 6,435,353 B2 | 8/2002 | Ryan | |
| 6,443,311 B2 | 9/2002 | Hendrickson | |
| 6,522,943 B2 * | 2/2003 | Dierauer | 700/223 |
| 6,561,339 B1 | 5/2003 | Olson | |
| 6,561,360 B1 | 5/2003 | Kalm | |
| 6,666,324 B2 | 12/2003 | Engarto et al. | |
| 6,677,548 B2 | 1/2004 | Robu | |
| 6,698,573 B2 | 3/2004 | Gienger | |
| 6,814,210 B1 | 11/2004 | Hendzel | |
| 6,897,395 B2 | 5/2005 | Shiibashi | |
| 6,903,359 B2 | 6/2005 | Miller et al. | |
| 6,946,612 B2 | 9/2005 | Morikawa | |
| 6,953,906 B2 | 10/2005 | Burns | |
| 6,994,220 B2 | 2/2006 | Schererz | |
| 7,004,396 B1 | 2/2006 | Quine | |
| 7,007,807 B1 | 3/2006 | Stockard | |
| 7,111,742 B1 | 9/2006 | Zimmermann | |
| 7,112,031 B2 | 9/2006 | Harres | |
| 7,138,596 B2 | 11/2006 | Pippin | |
| 7,170,024 B2 | 1/2007 | Burns | |
| 7,182,339 B2 * | 2/2007 | Engarto et al. | 271/265.04 |
| 7,210,893 B1 | 5/2007 | Overman | |
| 7,222,738 B1 * | 5/2007 | Stockard | 209/552 |
| 7,227,094 B2 | 6/2007 | Oexle | |
| 7,235,756 B2 | 6/2007 | De Leo | |
| 7,259,346 B2 | 8/2007 | Svyatsky | |
| 7,304,260 B2 | 12/2007 | Boller | |
| 7,378,610 B2 | 5/2008 | Umezawa | |
| 7,396,011 B2 | 7/2008 | Svyatsky et al. | |
| 7,397,010 B2 | 7/2008 | Wilke | |
| 7,397,011 B2 | 7/2008 | Berdelle-Hilge | |
| 2002/0053533 A1 | 5/2002 | Brehm | |
| 2003/0006174 A1 | 1/2003 | Harres | |
| 2003/0038065 A1 | 2/2003 | Pippin | |
| 2005/0056574 A1 * | 3/2005 | Emanuel et al. | 209/584 |
| 2005/0077215 A1 | 4/2005 | Nago | |
| 2005/0284103 A1 | 12/2005 | Hartness et al. | |
| 2006/0070929 A1 | 4/2006 | Fry | |
| 2006/0124512 A1 | 6/2006 | Quine | |
| 2006/0180520 A1 | 8/2006 | Ehrat | |
| 2006/0191822 A1 | 8/2006 | Avant | |
| 2007/0090029 A1 | 4/2007 | Avant | |
| 2007/0131593 A1 | 6/2007 | Burns | |
| 2007/0272601 A1 | 11/2007 | Cormack | |
| 2008/0011653 A1 | 1/2008 | Stemmle | |
| 2008/0012211 A1 | 1/2008 | Stemmle | |
| 2008/0027986 A1 | 1/2008 | Stemmle | |
| 2008/0093273 A1 | 4/2008 | Stemmle | |
| 2008/0093274 A1 | 4/2008 | Stemmle | |
| 2008/0164185 A1 | 7/2008 | Stemmle | |

FOREIGN PATENT DOCUMENTS

| | | |
|---|---|---|
| JP | 1159088 | 6/1989 |
| JP | 1271789 | 10/1989 |

OTHER PUBLICATIONS

U.S. Appl. No. 11/885,230, U.S. family member of International Application No. PCT/US2005/044406.

U.S. Appl. No. 11/856,174, U.S. family member of International Application No. PCT/2006/012892.

U.S. Appl. No. 11/856,299, U.S. family member of International Application No. PCT/US2006/012861.

U.S. Appl. No. 11/856,120, U.S. family member of International Application No. PCT/US2006/012888.

* cited by examiner

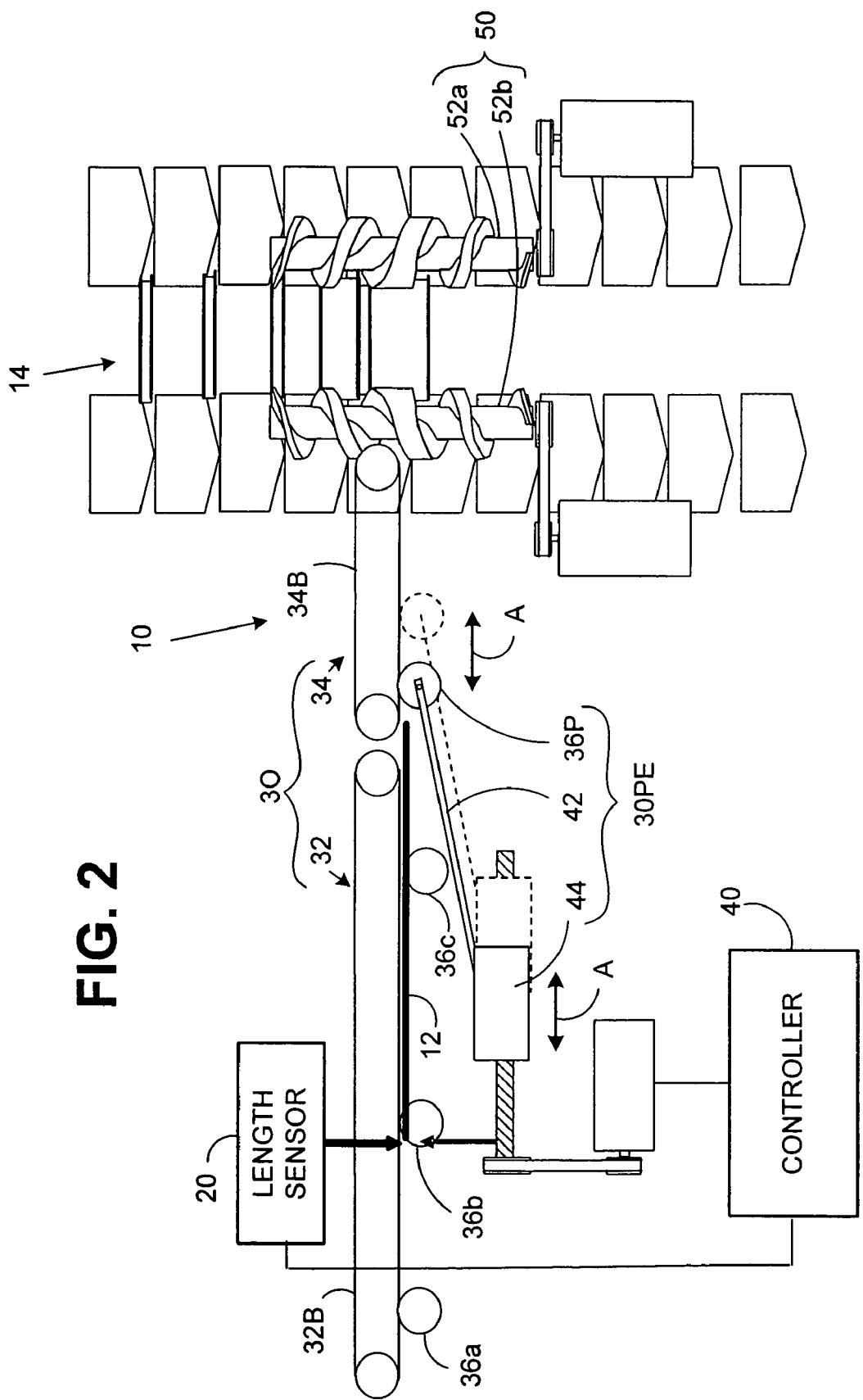

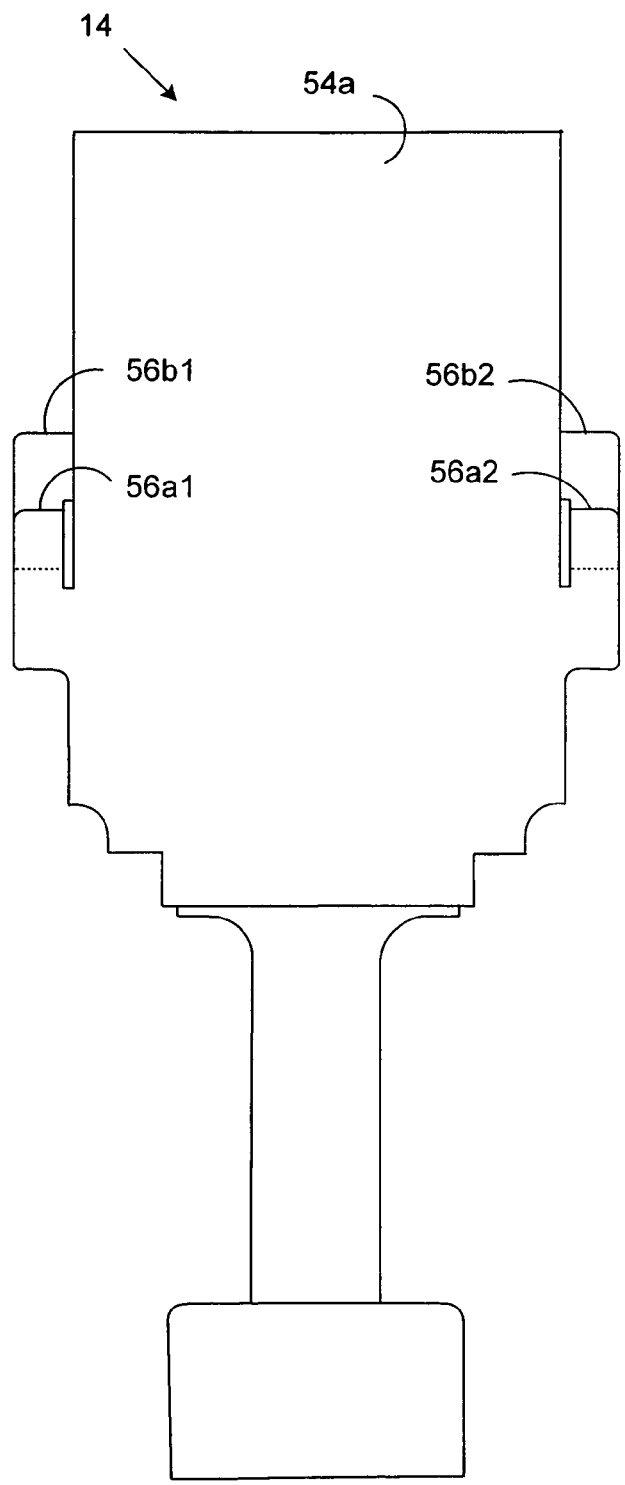 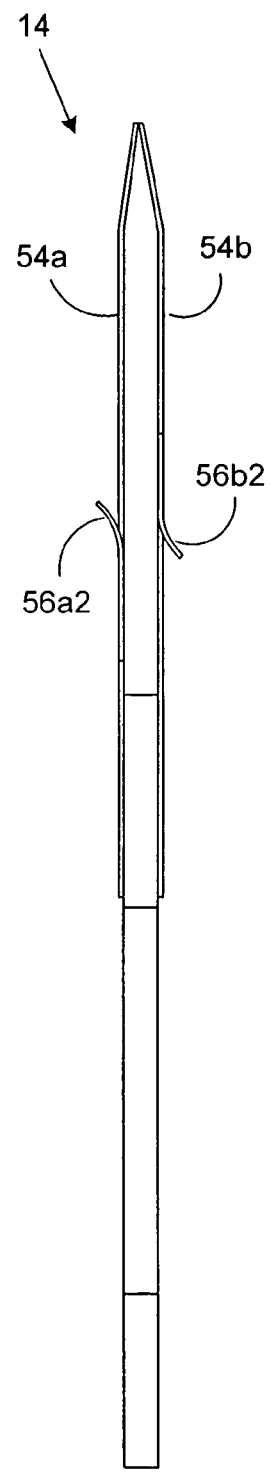
FIG. 6A  FIG. 6B

APPARATUS AND METHOD FOR POSITIONING OBJECTS/MAILPIECES

TECHNICAL FIELD

This invention relates to conveying/positioning objects/mailpieces, and, more particularly, to an apparatus and method for positioning/centering objects/mailpieces to a desired reference position. The objects/mailpieces may be positioned in a clamping assembly employed in a mixed-mail sorting apparatus.

BACKGROUND ART

The 2003 Presidential Commission Report on the Future of the USPS concluded that the Postal Service should continue to develop effective mailstream merging systems that optimize efficiency, e.g., maximize the number of mailpieces shipped with each mile traveled, while minimizing the labor content associated with mailpiece handling. With respect to the latter, all elements of the mail stream (letters, flats, periodicals, post cards, etc,) should be sorted, merged, and/or sequenced with the expectation that no subsequent handling would be required at each of the local postal branch offices, i.e., other than the physical delivery to the recipient address.

Most postal services are actively exploring opportunities to reduce the overall cost of processing mail by investing in postal automation equipment, particularly in postal automation associated with mailpiece sorting processes. While significant progress has been made sorting conventional letter-size mailpieces, the remaining mailpieces, e.g., magazines, periodicals, newspapers, catalogues and other flats-size mailpieces, often are not machinable and must be hand sorted. While only twenty-percent (20%) of the mailstream may be catagorized as "non-machinable", the time required to handle and sort such mailpieces is equal to or greater than the time spent sorting the other eighty percent (80%) of the mailstream.

Certain mailpieces are deemed non-machinable for two principal reasons. First, singulating mailpieces such as magazines and newspapers can present difficulties inasmuch as a portion of these mailpieces are unbound or unconstrained, that is, they have free-edges. As such, even small shear forces applied for the purpose of separating the mailpieces, can cause individual sheets or pages to be wrinkled, torn or otherwise damaged. Secondly, when such mailpieces are handled in the feeder, individual sheets or pages are prone to jam during sorting operations.

To combat the difficulties associated with handling these mailpieces, the mail entering automated postal equipment must be "prepared", before sorting operations can begin. Preparation may include a process of culling mailpieces which are likely to stall or jam the sorting equipment, or, alternatively, packaging mailpieces so as to facilitate separation and/or reduce the propensity for jamming. For example, magazines or newspapers may be wrapped or enclosed within a larger envelope to capture or contain the free-edges of the mailpiece. While these activities can prepare mailpieces for automated processing, the labor expense can completely offset or nullify the fiscal benefits derived by such automated handling equipment.

The following documents disclose various systems and subsystems of a mail sorter capable of handling all varieties of mail, i.e., a mixed-mail sorter: WO 2006/063204, WO 2006/063121, WO 2006/063125, WO 2006/110486, WO 2006/110465, and WO 2006/110484. One of the most essential features of the mixed mail sorter relates to the use of a clamping assembly operative to secure, transport, divert, sort and release the mailpieces. in addition to its principle mechanical functions, the clamps also include a means to uniquely identify the clamp and its associated mailpiece. As such, the sorting operation may be performed by a combination of requisite information, i.e., electronically scanned information in connection with the mailpiece (e.g., its destination address) together with the unique identifier of the clamp. Further, the sorting process may be performed without altering/marking the mailpiece, such as via a printed barcode symbology or other identification mark.

Having described the functional significance of the clamping assembly, it will also be appreciated that a mailpiece should be centered within a clamp assembly to obviate certain handling difficulties/inconsistencies. More specifically, it will be understood that the gravitational center of the combined clamp/mailpiece assembly will rotate about the overhead conveyor bar (i.e., acting as a support pivot) such that all moments/forces are in equilibrium. When the centroid of the mailpiece is misaligned relative to the centerline of the clamp assembly, the combined clamp/mailpiece assembly may assume a skewed orientation (i.e., relative to the vertical) when the assembly is hung from the overhead conveyor bar. As such, difficulties may arise when attempting to divert the mailpiece to a subsequent conveyor bar or release the mailpiece into a bin/container.

While, in prior art mail sorters, it is generally known to align mailpieces along one or two edges, e.g., in register along adjacent edges or along a corner thereof, no methods or systems are currently available to accurately center a mailpiece within a clamp assembly. That is, there has been no physical requirement, heretofore, to align the geometric center or centroid of a mailpiece with the gravitational center of the clamp assembly.

A need, therefore, exists for an apparatus and method for positioning or centering an object/mailpiece to a desired reference position so as to ensure predictable conveyance and release of objects/mailpieces while being manipulated by automated handling equipment.

BRIEF DESCRIPTION OF THE DRAWINGS

The accompanying drawings illustrate embodiments of the invention, and together with the general description given above and the detailed description given below, serve to explain the principles of the invention. As shown throughout the drawings, like reference numerals designate like or corresponding parts.

FIG. 2 is a schematic top view of the apparatus and method of FIG. 1A wherein the mailpiece is conveyed along a transport mechanism and passes along a length sensor for measuring the mailpiece length

FIG. 6A is a front view of the clamp assembly for securing and conveying objects/mailpieces in a mixed mail sorter apparatus.

FIG. 6b is a side view of FIG. 6A illustrating separation tabs for opening and closing the jaws of the clamp assembly.

SUMMARY OF THE INVENTION

An apparatus and method are provided for positioning objects at a desired reference position, including a sensor for determining the length of each object/mailpiece from a leading to a trailing edge, a transport mechanism having a positionable drive element for transporting the object/mailpiece lengthwise in succession along an object/mailpiece transport path, and a controller or processor for controlling the position, of the positionable drive element to release the object/mailpiece at a desired reference position. The described embodiments of the apparatus and method relate to positioning an object/mailpiece in a clamp assembly of a mixed mail sorter. The jaws of the clamp assembly are separated to receive the object/mailpiece by a pair of spiral cams. The spiral cams interpose and engage tabs of each jaw to open and close the clamp assembly as they concomitantly effect translation of the clamp assembly linearly past the positioning apparatus. The apparatus and method ensures predictable conveyance and release of objects/mailpieces while being manipulated by automated handling equipment.

DETAILED DESCRIPTION

The present invention is described in the context of an apparatus and system having a clamping assembly for securing, transporting, sorting and diverting mailpieces. While the invention is advantageous for mixed mail sorters, it should be appreciated that the apparatus and method for centering mailpieces is applicable to any apparatus which may employ a clamping assembly for acquiring and transporting objects.

Figure 1A:
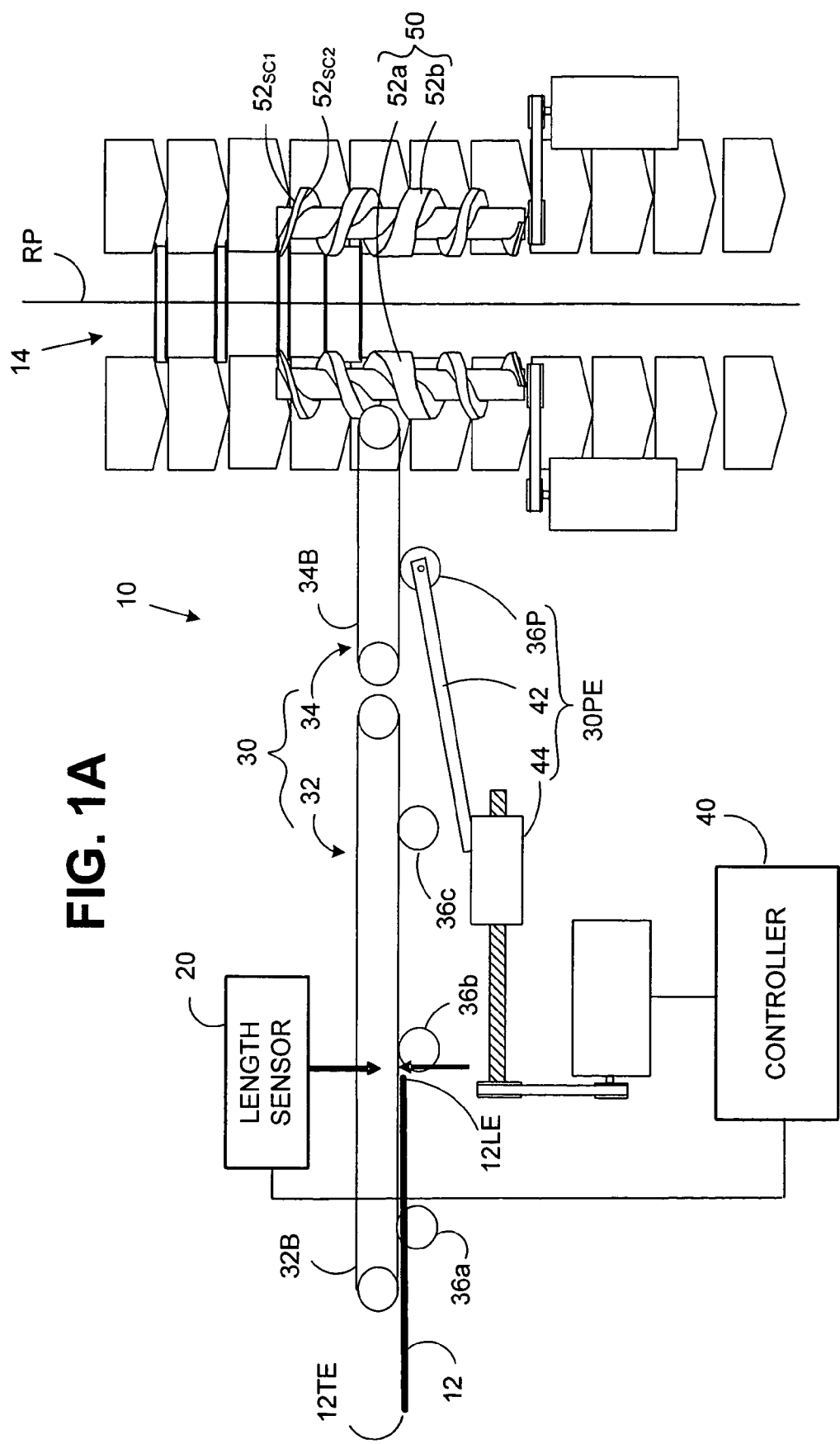
FIG. 1A is a schematic top view of an apparatus and method for positioning an object such as a mailpiece relative to a reference position within a clamp assembly.

The apparatus according to the present invention transports objects to a desired reference location or position. In FIGS. 1A and 16, the positioning apparatus 10 is integrated within a mixed mail sorter for transporting mailpieces 12 to a clamp assembly 14. The mixed-mail sorter may be similar to that illustrated and described in the following documents: PCT/US2005/044560, now WO 2006/063204; PCT/US2005/044406, now WO 2006/063121; PCT/US2005/044413, now WO 2006/063125; PCT/US2006/01892, now WO 2006/110486; PCT/US2006/012861, now WO 2006/110465; and PCT/US2006/012888, now WO 2006/110484, said applications being hereby incorporated by reference in their entireties.

The positioning apparatus 10 of the present invention enables processing of multiple objects/mailpieces 12 which may vary in size/shape and which may be advanced to positioning apparatus 10 via automated or manual delivery systems (not shown). With respect to size and shape variation, objects/mailpieces 12 for sorting using the mixed mail sorter may include conventional letter size envelopes, postcards, magazines, newspapers, flats-type mailpieces, etc. Furthermore, such objects/mailpieces may include a variety of packages including blow molded plastics and other objects suitable for pick-and-place handling equipments. Hence, for the purposes of this invention, the terms "object" and/or "mailpiece" will be used interchangeably and are intended to include letters, packages and parcels suitable for automated handling by a clamp assembly 14.

Figure 1B:
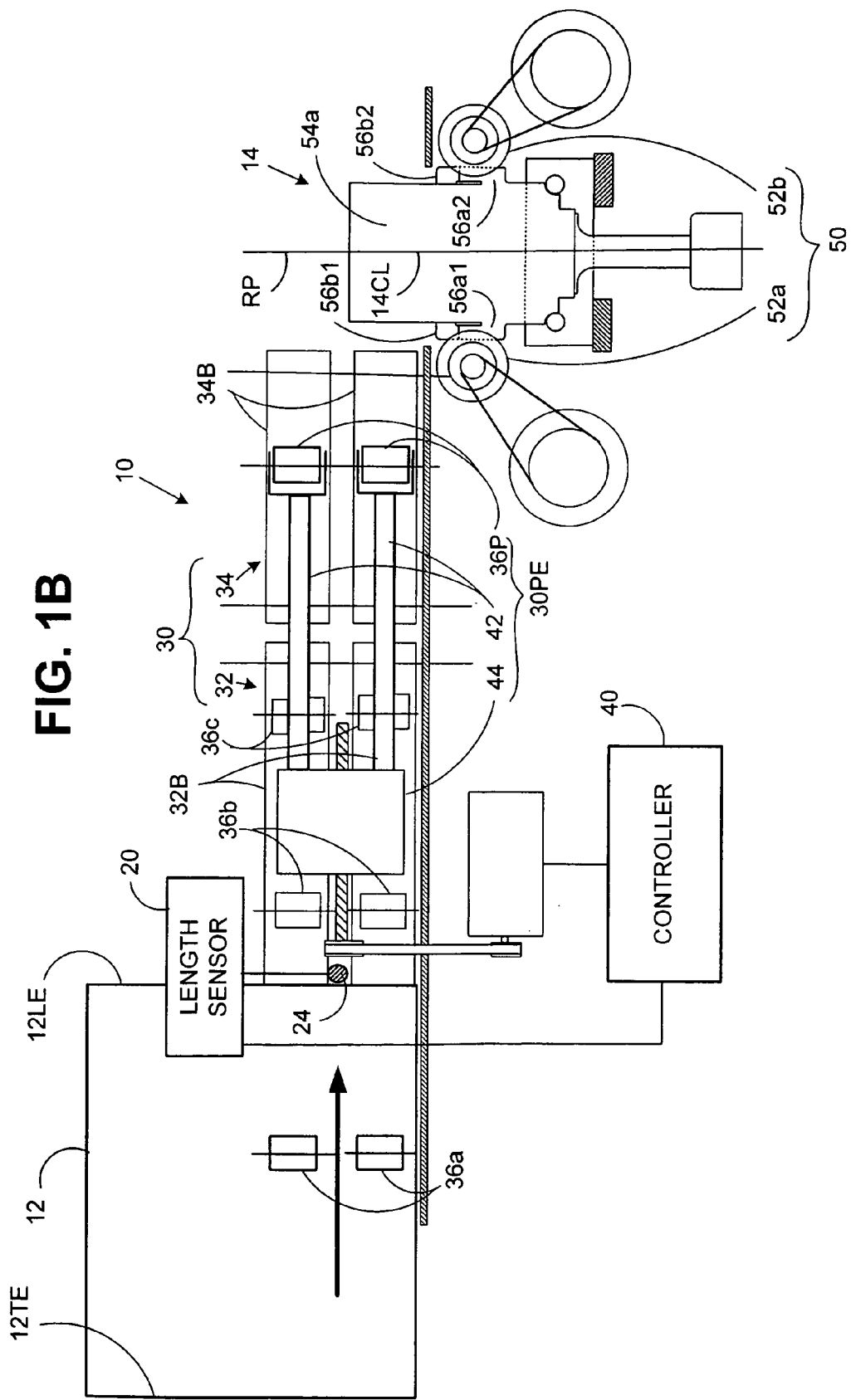
FIG. 1B is a schematic side view of the apparatus and method shown in FIG. 1A.

Regarding preprocessing of mail, the positioning apparatus 10 may be integrated with a variety of automated or manual delivery systems, upstream of the various sorter subsystems. In FIGS. 1A and 1B, the positioning apparatus 10 is capable of loading, transporting and clamping a variety of mailpieces 12 from a plurality of handling systems. For example, certain letter sized mailpieces 12 may be most efficiently preprocessed (i.e., presorted and singulated) by conventional automated feeders while yet other mailpieces 12, such as conventional newspapers, may best be manually handled (manually singulated and fed onto the transport) by an operator.

Generally, it is desirable to match the handling rate of the positioning apparatus 10 with the feed rate that objects/mailpieces 12 are fed to the positioning apparatus 10. For mailpieces up to 0.35 inches, the mixed mail sorter can handle objects/mailpieces at a rate of about eighteen-thousand (18,000) pieces per hour. Inasmuch as some of the most efficient automatic flats feeders can only feed at a rate of about seventy-five hundred (7,500) pieces per hour, the input rate of the feeder limits the output handling rate of the positioning apparatus 10 and the sortation rate of the sorter. Consequently, multiple input feed systems can be employed to match the handling rate of the positioning apparatus 10 and sortation rate of the sorter. For example, two automated flats feeders can be combined to increase the handling rate to at least fifteen thousand (15,000) mailpieces. Furthermore, since certain mailpieces are best fed manually (i.e., operator assisted), both automated and manual input feed systems may be combined to best match the handling/sortation rate of the positioning apparatus 10 and mixed mail sorter. A buffer module (not shown) can be incorporated and used by a system controller to monitor and control input traffic.

The top and profile views shown in FIGS. 1A and 1B, respectively, show a sensor 20 for determining the length of each object or mailpiece 12 from a leading edge 12LE to a trailing edge 12TE thereof, a transport mechanism 30 having a positionable drive element 30PE for transporting the object or mailpiece 12, and a controller or processor 40 for controlling the position of the drive element 30PE to release the object or mailpiece at a desired reference position RP. In FIG. 1B, the reference position RP is shown as the centerline of a clamp assembly 14, though the reference position can be any desired location depending upon the configuration of the clamp assembly 14, and/or the desired spatial relationship between the object/mailpiece 12 and the clamp assembly 14.

In the described embodiment, the length sensor 20 can be any of a variety of sensing devices. For example, a photocell 24 (see FIG. 1B) can be employed to view the time-differential between the leading and trailing edges 12LE, 12TE of the mailpiece 12. That is, the photocell 24 in combination with a velocity transducer (not shown) for measuring the speed of the transport mechanism 30 may be used to issue a length signal to the controller 40. Alternatively, if the velocity of the transport is known, the sensor can transmit change-of-state signals indicating the time of the lead and trail edges of the mailpiece passed by the sensor, and the controller 40 can calculate the mailpiece length using the known transport velocity.

Figure 3:
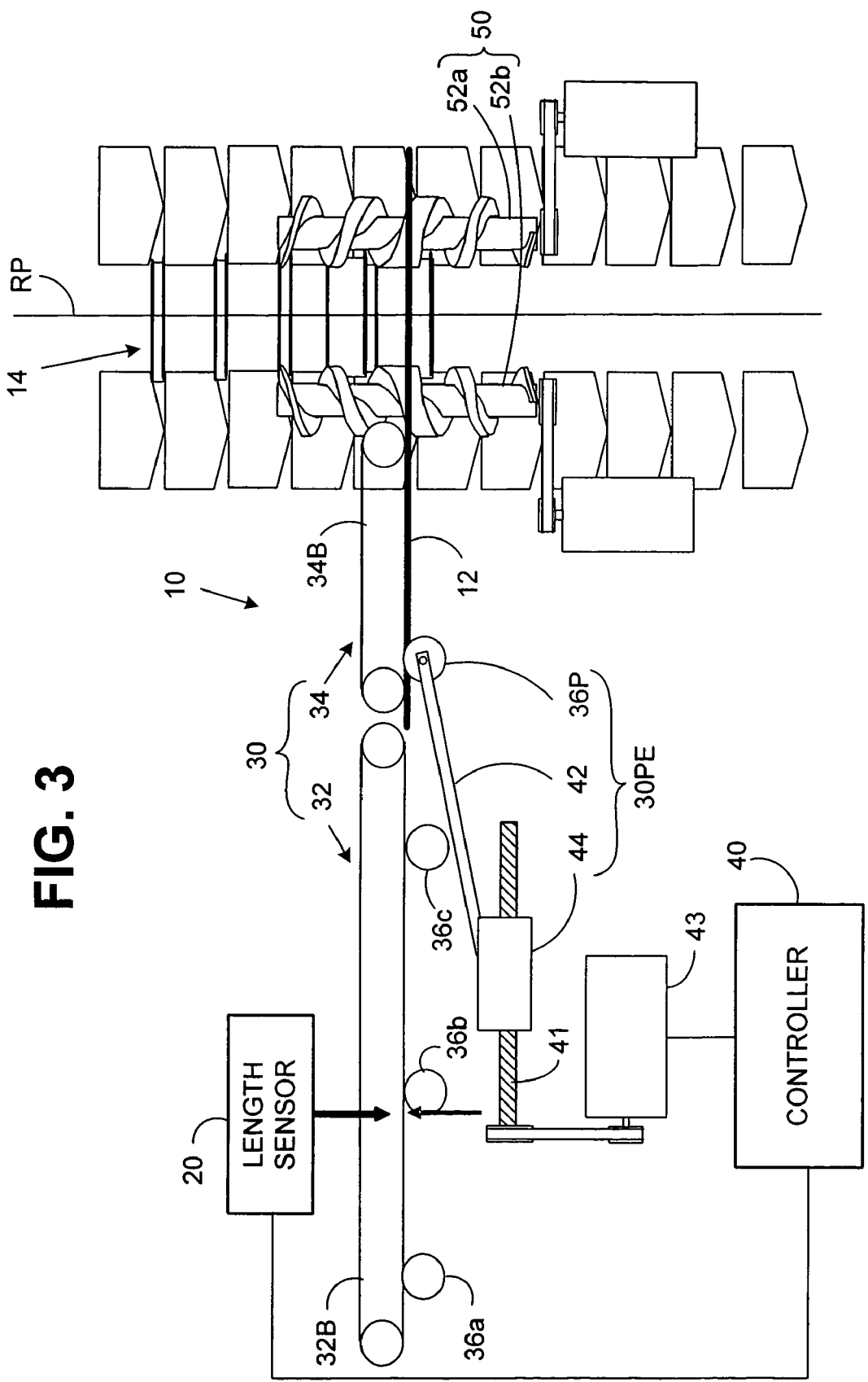
FIG. 3 is a schematic top view of the apparatus and method shown in FIG. 1A wherein the transport mechanism includes a displaceable drive element for controllably releasing the mailpiece at the desired reference position.

More specifically, in FIGS. 2 and 3, the transport mechanism 30 may comprise two transport segments, i.e., a constant velocity transport segment 32 and a variable velocity transport segment 34. The transport mechanism 30 may further comprise pairs of aligned transport belts 32B, 34B for transporting mailpieces 12 lengthwise in succession along a transport path and delivering the mailpieces 12 to the clamp assembly 14. Rollers 36a, 36b, 36c and 36P may be disposed in combination with the transport belts to effect frictional engagement of the mailpiece 12 with each of the transport belts 32B, 34B. As such, the rollers 36a, 36b, 36c and 36P function as spring loaded nips to press the mailpiece 12 with frictional engagement with transport belts 32 and 34, and thereby provide drive force to mailpiece 12.

Figure 4A:
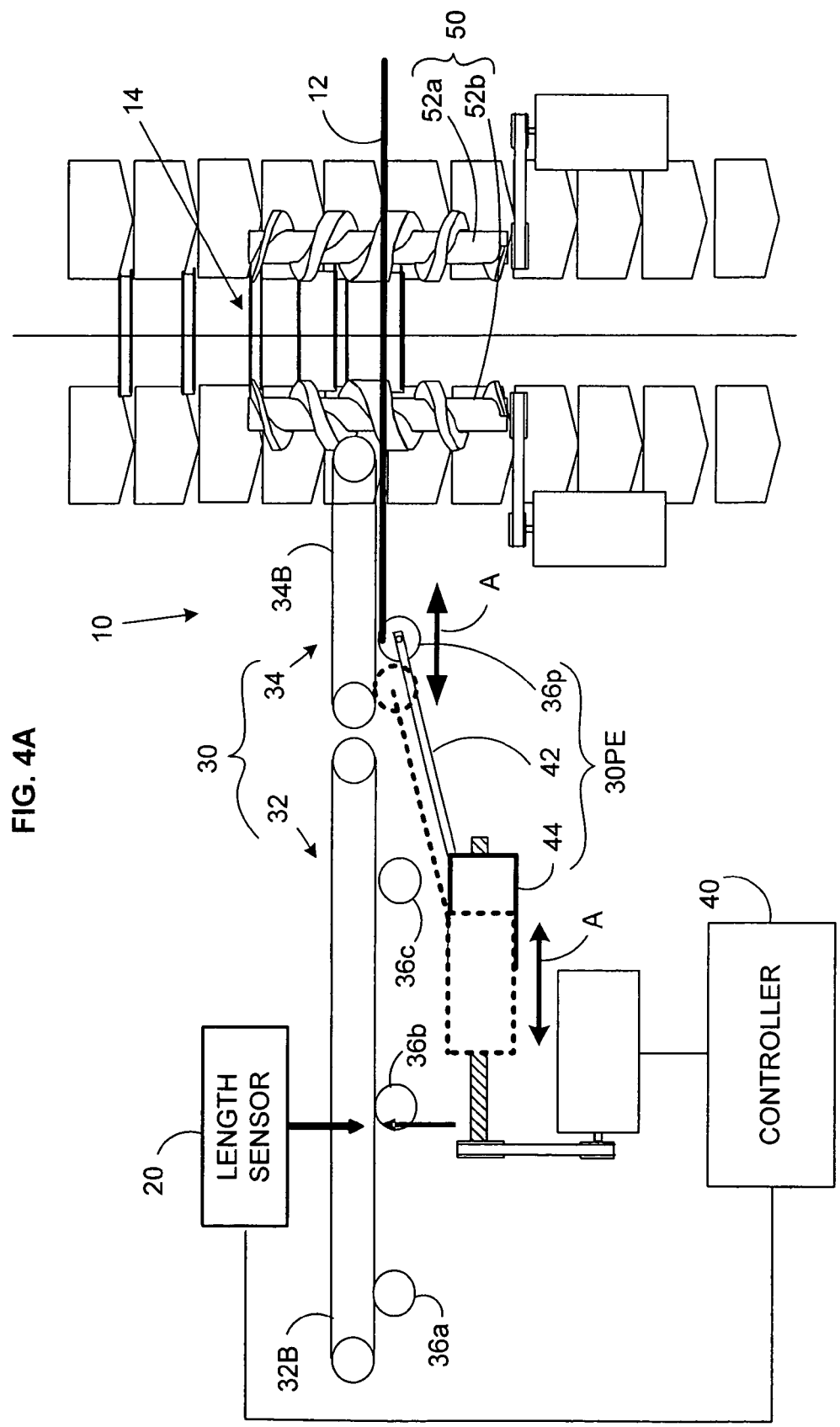
FIG. 4A is a schematic top view of the apparatus and method shown in FIG. 1A wherein a pair of spiral cams separates the jaws of the clamp assembly to accept the mailpiece therebetween and wherein the mailpiece is positioned relative to the gravitational centerline of the clamp assembly.
Figure 4B:
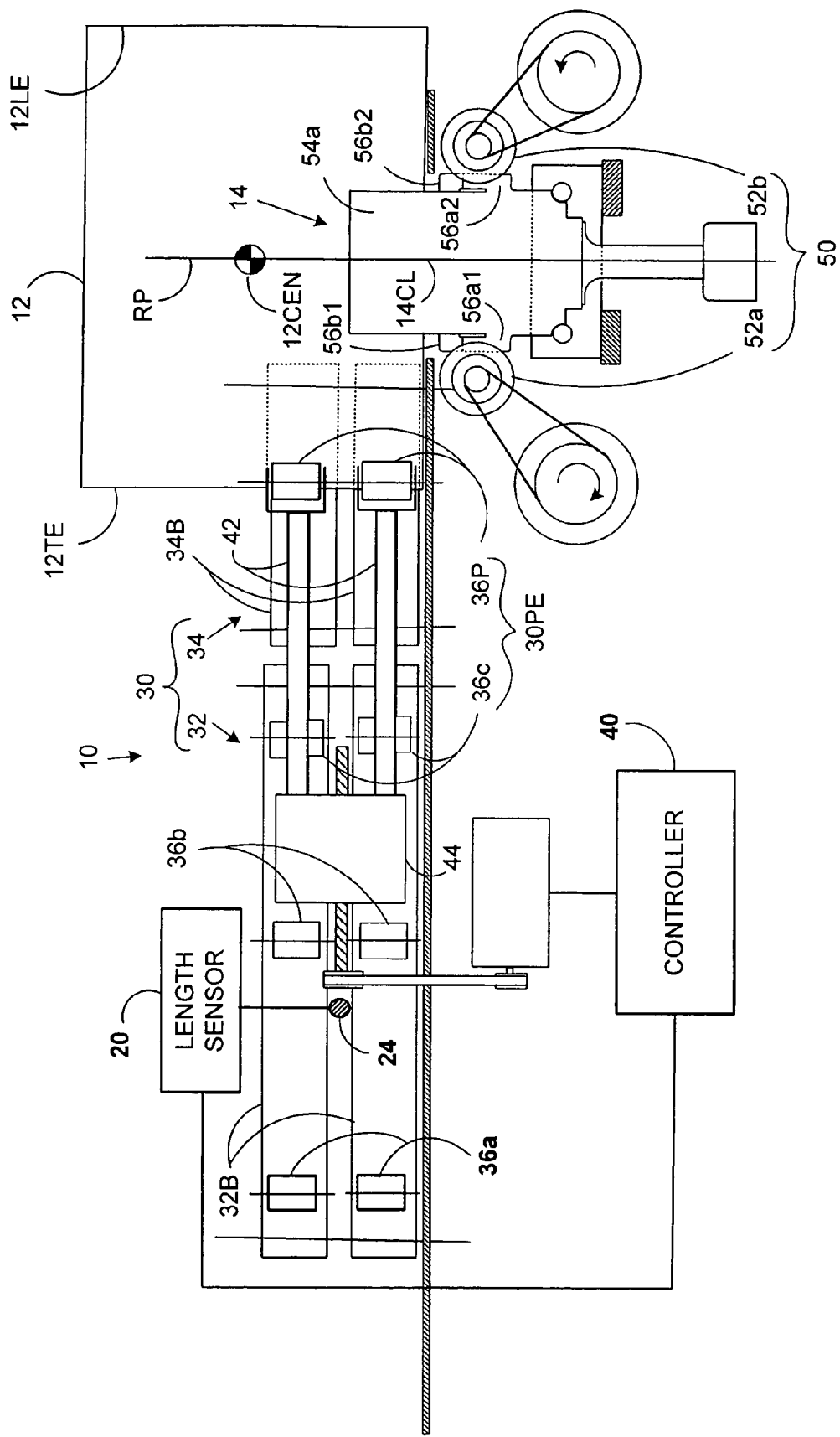
FIG. 4B is a schematic side view of the apparatus and method shown in FIG. 4A wherein the area centroid of the mailpiece is aligned relative to the gravitational centerline of the clamp assembly.

In the illustrated embodiment, shown in FIG. 2, the positionable drive element 30PE may include any of a variety of mechanisms for positioning a roller so as to release the mailpiece 12 at the desired reference position. More specifically, and referring to FIGS. 3, 4A and 4B, the length sensor 20 provides a length signal to the controller 40. Controller 40 issues a command to motor 43 to turn lead screw 41, which causes carriage 44 to translate, and thereby to move the roller 36P, forward or aft. In the described embodiment, a link 42 connects the roller 36P to carriage 44 to move the roller 36P in the direction of arrows A. With data obtained from the length signal, the position of the roller 36P may be determined such that the trailing edge 12TE of the mailpiece 12 (see FIG. 3) is released when the mailpiece 12 has reached its desired reference position RP. In the described embodiment, the desired reference position RP corresponds to alignment of the area centroid 12CEN or the mailpiece 12 with the gravitational centerline 14CL of the clamp assembly 14 (see FIG. 4B).

To further control the position of the mailpiece 12, the second transport segment 34 may include a means for varying the velocity of the belts 34B. As such, the speed, and consequently, the inertia of the mailpiece 12 may be reduced so that the mailpiece remains in the desired reference position once it is released by the positionable drive element 30PE. The variable velocity drive means (not shown) may also be controlled by signals derived from the controller 40.

Figure 5:
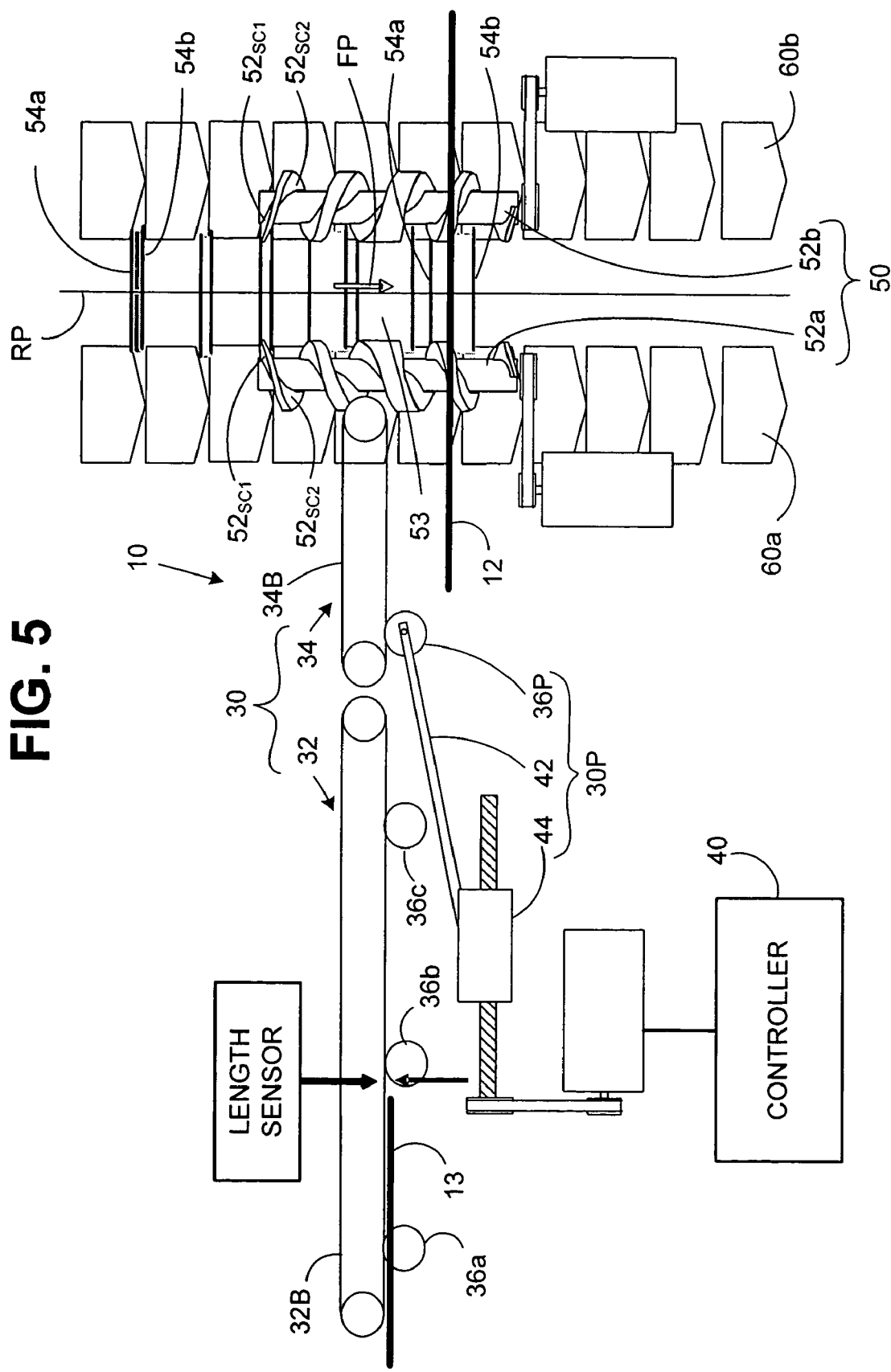
FIG. 5 is a schematic top view of the apparatus and method shown in FIG. 1A wherein the spiral cams effect closure and linear translation of the clamp assembly jaws to secure and move the mailpiece from the transport mechanism.

While a principle feature of the invention relates to the sensing, positioning and control elements for positioning an object at a desired position, the system for opening the clamp assembly 14 has its own inventive features. In FIGS. 5, 6A and 6B, the clamp assembly 14 includes a drive mechanism 50 having a pair of rotating spiral cams 52a, 52b for separating and closing the jaws 54a, 54b of the clamp assembly 14. More specifically, the jaws 54a, 54b of the clamp assembly 14 each include separation tabs 56a1, 56a2, 56b1, 56b2 formed along a lateral edge of each clamp assembly jaw 54a, 54b. Furthermore, spiral cam surfaces $52_{sc1}$, $52_{sc2}$, of each of the spiral cams 52a, 52b interpose the separation tabs 56a1, 56a2, 56b1, 56b2 such that rotation of the spiral cams 52a, 52b, effects opening and closure of the clamp assembly jaws 54a, 54b (best seen in FIGS. 5, 6A and 6B). Moreover, rotation of the spiral cams 52a, 52 effects linear translation of the clamp assembly 14 in the direction of arrow FP along the length of the drive mechanism 50. This linear translation is synchronized with clamp transport elements 60a and 60b. Such translation moves the mailpiece 12 away from the belts 34B of the transport mechanism 30 to obviate any further motion or displacement once the mailpiece has reached its desired reference position RP. This motion, in a direction transverse to the lengths of the mailpieces and, more particularly, perpendicular to the direction of transport 30, also enables a next mailpiece 13 to be positioned in the next clamp 53.

In summary, the apparatus and method for positioning/centering objects/mailpieces includes a novel positionable drive element to release the object/mailpieces at a desired reference position. The invention includes a variable velocity transport mechanism to decrease the speed and inertia of the object/mailpiece as it comes to rest in the clamp assembly jaws. Furthermore, the clamp assembly includes an inventive drive mechanism operative to open and close the clamp assembly jaws as the object/mailpiece is conveyed away from the transport mechanism and to subsequent stations of the mixed mail sorter. Consequently, the apparatus and method ensures predictable conveyance and sorting of objects/mailpieces while being manipulated by automated handling equipment.

Although the invention has been described with respect to a particular embodiment thereof, it will be understood by those skilled in the art that the foregoing and various other changes, omissions and deviations in the form and detail thereof may be made without departing from the scope of this invention.

What is claimed is:

1. An apparatus for positioning objects at a desired reference position, comprising:
   a sensor for determining the length of each object from a leading to a trailing edge thereof and issuing signals indicative of length;
   a transport mechanism for transporting the object, the transport mechanism including a positionable drive element, and
   a processor, responsive to the length signal, for issuing a position signal to the positionable drive element, the drive element operative to release the object upon reaching the desired reference position.

2. The apparatus according to claim 1 wherein the transport mechanism comprises a constant velocity transport mechanism disposed upstream of a variable velocity transport mechanism for conveying the objects to the desired reference position.

3. The apparatus according to claim 1 wherein the length sensor records the time difference between the leading and trailing edges of each object passing a reference point.

4. The apparatus according to claim 3 wherein the length sensor includes at least one optical sensor for detecting the time difference between leading and trailing edges of each object.

5. The apparatus according to claim 1 wherein the transport mechanism comprises at least one drive belt in combination with at least one roller to define a nip for conveying each object.

6. The apparatus according to claim 5 wherein the positionable drive element includes an actuator for linearly displacing the roller, thereby varying the point of object release.

7. The apparatus according to claim 2 wherein the constant velocity transport mechanism moves the object at a transport velocity, and wherein the variable velocity transport mechanism reduces the transport velocity prior to release of the object from the positionable drive element.

8. The apparatus according to claim 1 wherein:
   the transport mechanism further comprises:
      at least one drive belt and the positionable drive element of the transport mechanism includes a roller to define a nip for conveying each object;
      an actuator for linearly displacing the roller, thereby varying the point of object release.

9. A system for transporting and positioning mailpieces of variable size into a clamp assembly, comprising:
- a drive mechanism including a pair of rotating spiral cams engaging jaws of the clamp assembly, the spiral cams effecting separation and closure of the clamp assembly jaws;
- a mailpiece length sensor for determining the length of each mailpiece from a leading to a trailing edge thereof and issuing a signal indicative of the length of each mailpiece;
- a transport mechanism for transporting the mailpiece toward the clamp assembly, the transport mechanism including a positionable drive element,
- a processor, responsive to the length signal, for issuing a position signal to the positionable drive element, the drive element operative to move in response to the position signal and release the mailpiece to a desired reference position within the jaws of the clamp assembly.

10. The system according to claim 9 wherein the clamp assembly defines a gravitational centerline and wherein the desired reference position relates to substantial alignment of the area centroid of each mailpiece with the gravitational centerline of the respective clamp assembly.

11. The system according to claim 9 wherein the clamp assembly includes separation tabs formed along a peripheral edge of each clamp assembly jaw and wherein the spiral cam defines cam surfaces interposing the tabs such that rotation of the cam surfaces effects opening and closure of the clamp assembly jaws.

12. The system according to claim 11 wherein rotation of the cam surfaces effects linear translation of the clamp assembly along the length of the spiral cam drive mechanism.

13. The system according to claim 9 wherein cam surfaces define a pitch dimension therebetween which varies in magnitude such that the clamp assembly jaws are spread at a first axial position along the spiral cams to accept a mailpiece and are closed at a second axial position to secure the mailpiece within the clamp assembly.

14. The system according to claim 9 further comprising a constant velocity transport mechanism disposed upstream of a variable velocity transport mechanism for conveying the mailpieces to the desired reference position.

15. The system according to claim 9 wherein the length sensor records the time difference between the leading and trailing edges of each mailpiece passing a reference point.

16. The system according to claim 9 wherein the length sensor includes at least one optical sensor for detecting the time difference between leading and trailing edges of each mailpiece.

17. The system according to claim 14 wherein the constant velocity transport mechanism moves the object at a transport velocity, and wherein the variable velocity transport mechanism reduces the transport velocity prior release of the object by the positionable drive element.

18. The system according to claim 17 wherein the positionable drive element includes an actuator for displacing the roller in a direction parallel to the transport direction, thereby varying the point of mailpiece release.

19. A method for positioning an object to a reference position, the object having a leading and trailing edge, the method comprising:
- transporting the object;
- measuring a length dimension between the leading and trailing edges of the object during transport;
- calculating a desired position for a positionable drive element as a function of said measuring of the length dimension of the object;
- moving the positionable drive element to the desired position to release the object upon the object reaching the desired reference position.

20. The method according to claim 19 wherein the object is transported at a transport velocity and further comprises:
- decreasing the transport velocity of the object prior to release of the object by the positionable drive element.

21. The method according to claim 19 wherein the object defines an area centroid and further comprises positioning the object such that the area centroid is aligned with respect to the reference position.

22. The method according to claim 19 further comprising:
- providing a clamp assembly having a pair of separable jaws;
- opening the jaws of the clamp assembly to receive the object:
- closing the jaws of the clamp assembly to secure the object therebetween upon release of the object by the positionable drive element.

23. A method for transporting and positioning mailpieces of variable length dimension into a clamp assembly, the method comprising:
- feeding mailpieces to a transport mechanism;
- transporting the mailpieces;
- measuring a length dimension between a leading and trailing edge of each mailpiece during transport;
- providing a plurality of clamp assemblies each having a pair of separable jaws;
- separating the jaws of each clamp assembly to receive each mailpiece;
- calculating a desired position for a positionable drive element;
- moving the positionable drive element to the desired position to release the mailpiece upon reaching the desired reference position.

24. The method according to claim 23 wherein the mailpiece is transported at a transport velocity and further comprises:
- decreasing the transport velocity of the mailpiece prior to the release by the positionable drive element.

25. The method according to claim 23 wherein the mailpiece defines an area centroid and further comprises positioning the mailpiece such that the area centroid is aligned with respect to the reference position.

26. The method according to claim 23 wherein each mailpiece is fed to the transport mechanism by an automated delivery system.

27. The method according to claim 23 wherein each mailpiece is fed to the transport mechanism by an operator assisted delivery system.

28. The method according the claim 23 wherein some mailpieces are fed to the transport mechanism by an automated delivery system and other mailpieces are fed to the transport mechanism by an operator-assisted delivery system.

29. An apparatus for positioning objects at a desired reference position, comprising:
- a transport mechanism for transporting objects in succession lengthwise along an object transport path;
- the transport mechanism comprising:
    - a positionable drive element;
    - a mechanism to position the positionable drive element selectively with respect to the object transport path in response to a position signal;
- a sensor for (1) determining object length from a leading edge to a trailing edge of each the object as each the object is transported along the object transport path, and (2) issuing an object length signal indicative the object length;

a processor, responsive to the object length signal, for issuing the position signal to the positionable drive element to position the positionable drive element at a position as a function of the object length to release the object upon reaching the desired reference position.

30. An apparatus comprising:

a transport mechanism for transporting objects in succession lengthwise along an object transport path;

a drive mechanism positioned to receive the objects from the transport mechanism and to drive the objects in succession along a direction transverse to the lengths of the objects with each of the objects being maintained in desired reference position while being driven by the drive mechanism;

the transport mechanism comprising:

a positionable drive element;

a mechanism to position the positionable drive element selectively with respect to the object transport path in response to a position signal;

a sensor for (1) determining object length from a leading edge to a trailing edge of each the object as each the object is transported along the object transport path, and (2) issuing an object length signal indicative the object length;

a processor, responsive to the object length signal, for issuing the position signal to the positionable drive element to position the positionable drive element at a position as a function of the object length to release the object upon reaching the desired reference position to be driven by the drive mechanism.

31. The apparatus according to claim 30, wherein:

the desired reference position for each of the objects is the geometric center of each of the objects in relation to the driving direction of the drive mechanism.

32. The apparatus according to claim 30, wherein:

the desired reference position for each of the objects is the geometric center of each of the objects being aligned relative to the driving direction of the drive mechanism.

* * * * *